Feb. 15, 1966 WULF-DIETER WIRTH 3,235,867
RADAR SIGNAL PROCESSING ARRANGEMENT INCORPORATING
BINARY COUNTER AND THRESHOLD DETERMINING MEANS
Filed Aug. 19, 1963

INVENTOR
Wulf-Dieter Wirth

BY Spencer & Kaye
ATTORNEYS

United States Patent Office 3,235,867
Patented Feb. 15, 1966

3,235,867
RADAR SIGNAL PROCESSING ARRANGEMENT INCORPORATING BINARY COUNTER AND THRESHOLD DETERMINING MEANS
Wulf-Dieter Wirth, Berlin-Dahlem, Germany, assignor to Telefunken Patentverwertungs-G.m.b.H., Ulm (Danube), Germany
Filed Aug. 19, 1963, Ser. No. 303,050
Claims priority, application Germany, Aug. 22, 1962, T 22,625
13 Claims. (Cl. 343—16)

The present invention relates to a system for automatically evaluating, i.e., processing, digital radar signals.

In radar installations in which targets are picked up by means of reflected echo pulses, the horizontal or azimuthal beam angle of the antenna, the pulse repetition frequency at which the set operates, and the rotational speed of the antenna are so selected that there will be received a group of echo pulses reflected from a target, all of which echo pulses have the same time delay with respect to the transmitted pulse. However, due to the noise that is ever present in the receiver, the presence of target pulses will not always be recognized, nor will it always be possible to identify the middle of the target echo pulse group which middle represents the actual location of the target.

It is known to divide the area covered by the radar installations into a plurality of so-called distance rings, i.e., into concentric annular regions having the antenna at the center, each region having a given inner and a given outer diameter. This is done by providing the radar set with gate circuits each of which will be open for a time interval equal to the duration of a transmitted pulse, the individual gate circuits operating with different stepped delay times with respect to the transmitter pulse. In this way, the signals which are reflected by a target located in a given ring are identified, so that the signals emanating from each ring can be applied to a corresponding one of a plurality of separate processing devices.

It is also known to digitalize the radar video signal into a binary 0-L-series (L being the symbol to represent the binary number 1); this is done by producing a pulsed L-pulsed (L-bit) when the incoming signal exceeds a given threshold and a pulsed 0-pulse (0-bit) when the signal is below such threshold. The L-pulses from a given distance ring will then occur with different probability, as follows: The L-pulses will appear in dense succession when the antenna lobe is in the process of sweeping a target located in the particular distance ring, whereas the L-pulses will appear less frequently when there is no target but only noise.

There exist various circuits, composed of digital modules, for identifying target pulse groups and for determining the bearing of the center thereof. Such circuits make use, predominantly, of shifting registers which receive given segments of the bit sequence, these shifting registers being used in conjuntcion with, for example, counters which determine from the distribution of the 0-bits and L-bits the frequency with which the L-bits occur in comparison with a given threshold. If this threshold is exceeded, it is assumed that there is a target present. The shifting registers may also be used in conjunction with other devices, such as additional counters for automatically determining from the frequency distribution the start and the finish of an echo pulse series caused by a target. The above-mentioned digital components, which can be termed "active" components, sometimes involve the use of storage registers, and, in actual, operating target recognition systems, become quite complicated and expensive.

It is, therefore, an object of the present invention to provide a system which overcomes the above drawbacks, namely, a digital target recognition arrangement which is of substantially simpler construction than the prior art arrangements. According to the present invention, the signals coming from a given distance ring are processed by means of a counter which is advanced by L-signals and reset by 0-signals. Means are provided for testing whether the number counted by the counter prior to its being reset exceeded a given threshold, and if yes, for producing a target pulse as well as for interrogating the counter to determine the number to which it has counted, thereby to obtain a value representing the width of the target from which the azimuthal bearing of the middle of the target can be determined. Thus, a target can be considered as being present, and the steps necessary for determining the position of the targe will be carried out only if a predetermined number of L-signals follow each other without interruption, i.e., without the intervention of a 0-signal.

Additional objects and advantages of the present invention will become apparent upon consideration of the following description when taken in conjunction with the accompanying drawings in which.

Figures 1, 2:
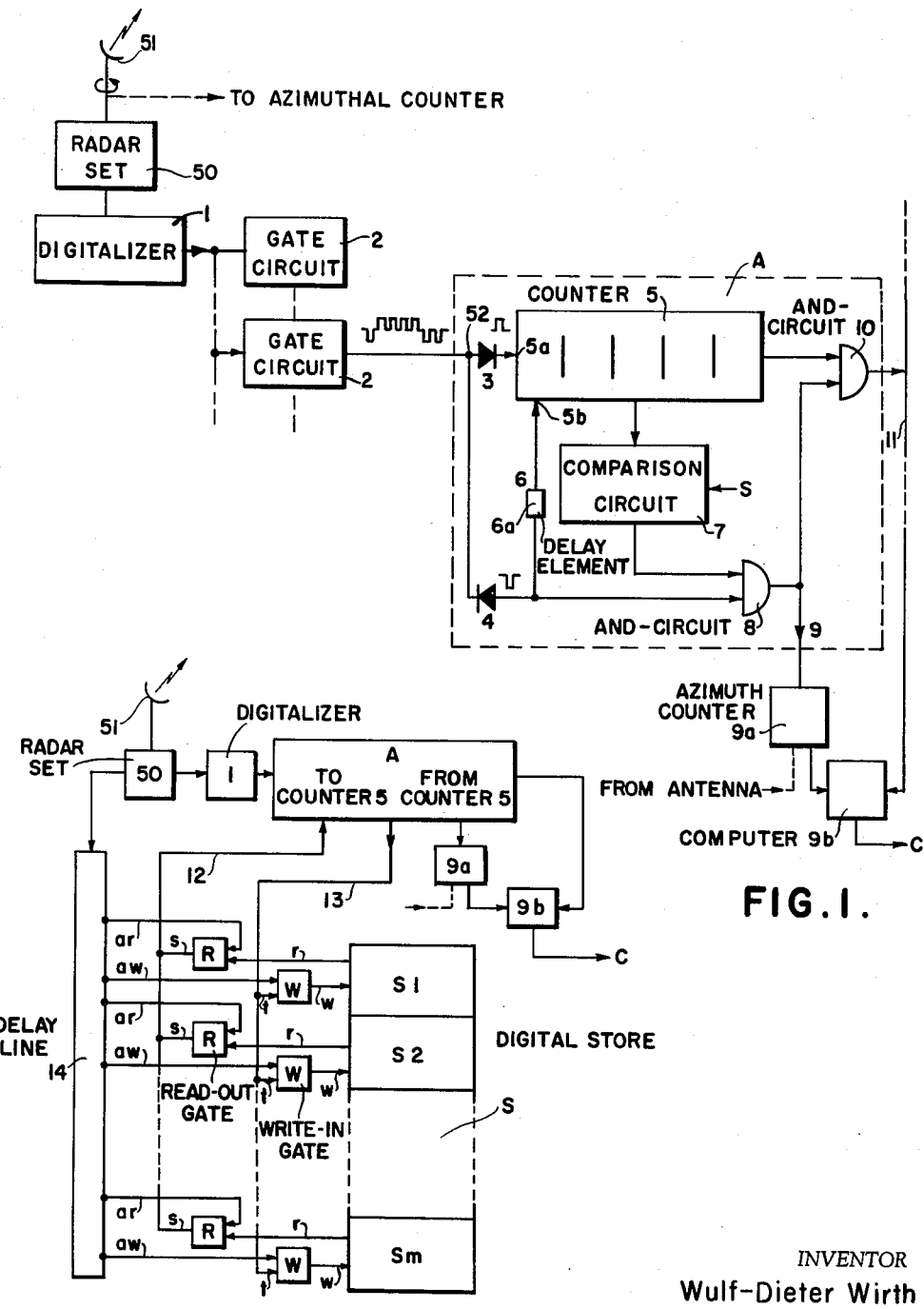
FIGURE 1 is a circuit diagram of one embodiment of the present invention.
FIGURE 2 is a circuit diagram of another embodiment of the instant invention.

Referring now to the drawings and to FIGURE 1 thereof in particular, the same shows a radar set 50 equipped with a rotating antenna 51. The output of the radar set is connected to a digitalizer 1 which transforms the pulses picked up by the radar antenna into a series of L and 0 pulses representing, respectively, the reception and non-reception of a reflected echo. The output of the digitalizer 1 is connected to a plurality of gate circuits which select from the incoming digitalized video signals those signals which pertain to a corresponding distance ring. The gate circuits 2 are so designed that they correspond to immediately adjacent distance rings so that the entire area about the radar antenna 51 will be covered. The incoming signals "L" will be assumed to be constituted by positive pulses and the signals "0" by negative pulses; this is easily achieved by means of suitably designed pulse former stages in the digitalizing circuit 1 or by suitably designing the gates 2, as is well known in the art.

The pulses passed, for example, by the lower one of the two illustrated gates 2, are shown just to the right of that gate. These pulses are applied to the input 52 of a unit A from which positive "L" pulses are passed, via a diode 3, to the counting input 5a of an n-digit binary counter 5, which is advanced by one unit upon the application of each "L" pulse. In the illustrated embodiment, the binary counter is shown as a five digit unit, i.e., $n=5$. The digits of the counter 5 are connected with a conventional comparison circuit 7. The threshold value S, in binary form, is applied to another input of circuit 7. The comparison circuit 7 which is conventionally constituted by conjunctive and disjunctive circuits, compares the contents of counter 5 with the threshold value, and produces an output signal if the contents of counter 5 is larger than (or if the contents of counter 5 is at least equal to) the threshold value. This output signal is applied to one input of an AND-circuit 8, which, in turn, produces an output signal if its other input receives a signal. This other input of AND-circuit 8 is connected to input 52 via a second diode 4 which is opposed to diode 3 and thus does not pass any positive pulses; instead, the diode 4 passes the negative "0" pulses arriving at 52. Consequentially, the AND-circuit 8 will produce an output signal if, upon the arrival of a "0" signal at 52, the contents of the binary counter 5 exceeds the predetermined threshold value S. The output signal of AND-circuit 8 is applied to one input of another gate, such as AND-circuit 10, whose other input is connected to the counter 5. Thus, when the AND-circuit 10 is opened by an output signal from AND-circuit 8, the contents of the counter 5 is applied to an $n$-digit (here, $n$ again equals 5) bus 11, which passes on the contents of the counter, the latter being representative of the width of the target. It will be appreciated that the AND-circuit 10 and bus 11 are shown schematically only, since, in practice, sufficient components will be provided to pass on the value for each digit in counter 5 to each line of the multiple-line bus 11.

The output signal produced by AND-gate 8 is applied via a line 9 for interrogating an azimuth counter 9a which is pulsed with antenna rotation clock pulses of the radar set and which gives the instantaneous antenna bearing and hence the bearing of the target. The width of the target and the bearing of the target at the end of the counting operation are fed into a computer 9b which, on the basis of this information, calculates the bearing of the center of the target and delivers the result at C.

Each "0" pulse passed by diode 4 is also applied, via a line 6, to the reset input 5b of counter 5, so that the counter is automatically reset upon the application of a "0" pulse to the input 52. In practice, the line 6 will incorporate suitable means, such as a delay element 6a, which delays the application of the "0" pulse to the reset input 5b of the counter sufficiently long to allow the components 7, 8, 9, 9a, 9b, 10, and 11 to carry out their above-described function.

Systematic statistical experimentation has shown that if the threshold value S, i.e., the number of successive L-signals which initiate the target localization process is properly selected for the prevailing operating conditions, the greatly simplified circuitry of the present invention is, for all practical purposes, just as good as the heretofore conventional, substantially more complicated systems. The following are examples of what values for S should be selected in order to bring about the optimum recognition of targets in the form of aircraft: $S=5$ if there are 10 pulses per half width; $S=7$ at 15 pulses per half width; $S=12$ at 20 pulses per half width.

In the circuit described above, a separate unit A is provided for each gate circuit 2. However, inasmuch as the signals from each distance ring will arrive at time intervals which are spaced by the width of the transmitted pulse, it suffices if but one unit A is provided, and if suitable time-multiplexing means are provided which connect the single unit A successively to each of the distance rings. Such an arrangement is shown in FIGURE 2 in which the unit A is connected to the digitalizing stage and is successively connected to storage cells which temporarily store the contents of the counter for the distance rings. The counter receives the count and the actual signal from the respective distance ring and operates on the basis of both. Inasmuch as all that has to be stored for each distance ring is the contents of the counter, the capacity of the storage units remains within reasonable limits (e.g., if there are 1,000 distance rings, the total capacity of the storage units will have to be $5 \times 1,000 = 5,000$ bits).

In FIG. 2, S is a digital store with storage cells S1, S2 ... S$m$ (e.g., $m=1000$), each of which is adapted to store, e.g., five bits. Each cell is connected to a read-out gate R via a channel $r$ and to a write-in gate W via a channel $w$. Channels $r$ are input-channels of the gates R, and channels $w$ are the output-channels of the gates W. The output-channel $s$ of each of the gates R is connected to a bus channel 12. An input channel $t$ of each of the gates W is connected to a bus channel 13. For parallel transmission of the 5 bits, the gates R and W are fivefold gates, and each of the lines $r$, $w$, $s$, $t$, 12, 13 drawn as single lines, represents a five digit-channel.

Each of the gates R has an input line $ar$ and each of the gates W has an input line $aw$, these lines serving for the appliance of pulse shaped signals which open the gate for a short time. Each of the input lines $ar$ and $aw$ is connected to an individual tapping point of a delay line 14.

When a radar pulse is sent out by the antenna 51, a separate pulse which is generated simultaneously in the radar set 50 is transmitted to the delay line 14. While travelling along this line, the pulse reaches the first tapping point connected to the activating input $ar$ of the read out gate R of the first storage cell at a moment shortly before an echo pulse pertaining to the first distance ring may be expected, and opens the gate for a short time with the consequence that the five bits contained in the cell are transmitted to the counter 5 in the unit A via bus 12. These five bits represent the amount which had been reached by the counter after the preceding radar pulse and pertaining to the first distance ring. If now, during the time corresponding to the first distance ring, a positive "L"-pulse is issued by the digitalizer 1 and transferred to the unit A, the contents of the counter is increased by one unit. In every case, shortly before the beginning of the time corresponding to the second distance ring, the contents of the counter 5 is extracted from it via bus channel 13 and is written into the first storage-cell. This is effected by the pulse travelling in the delay line 14 when it passes the second tapping point, thereby setting a signal which, for a short time, opens the write-in gate W of the first storage cell. Immediately after that the pulse in the delay line 14 passes the third tapping point, thereby opening the read-out gate R of the second storage cell, and the same cycle as described is repeated for this second storage cell in order to evaluate the second distance ring, and so on, until the last distance ring and the correlated last storage cell is reached.

It may be convenient to alter the organization of the store in such a way that each cell of the store is capable of storing the amounts of the counter 5 for several successive distance rings, e.g., three, and to add registers, e.g., three, which serve as buffer registers inconnected between the counter and a store of lower access time.

It will be understood that the above description of the present invention is susceptible to various modifications, changes, and adaptations, and the same are intended to be comprehended within the meaning and range of equivalents of the appended claims.

What is claimed is:
1. In a radar signal processing arrangement, the combination which comprises:
 (a) a resettable binary counter responsive to a series of L and 0 signals coming from a given region, said means being advanced by an L signal and reset by a 0 signal; and
 (b) means for determining whether, upon the reception of a 0 signal and prior to the resetting of said counter, the count reached by said counter exceeded a predetermined threshold value.
2. The combination defined in claim 1, further comprising
 (c) means effective upon an affirmative determination by said means (b) for producing a signal indicating the presence of a target.
3. The combination defined in claim 1, further comprising
 (c) means effective upon an affirmative determination by said means (b) for producing a signal indicating the presence of a target as well as for producing an output signal representative of the count reached by said counter prior to the reception of a 0 signal.

4. The combination defined in claim 3 wherein said region is a distance ring.

5. In a radar signal processing arrangement, the combination which comprises:
   (a) means for digitalizing the signals received by a radar set to produce a series of pulses made up of L and 0 signals;
   (b) a resettable binary counter responsive to said series of pulses, said counter being advanced by an L signal and reset by a 0 signal; and
   (c) means for determining whether, upon the reception of a 0 signal and prior to the resetting of said counter, the count reached by said counter exceeded a predetermined threshold value.

6. In a radar signal processing arrangement, the combination which comprises:
   (a) means for digitalizing the signals received by a radar set to produce a series of pulses made up of L and 0 signals;
   (b) a plurality of gate means connected to the output of said digitalizing means, each of said gate means pertaining to a different one of a plurality of distance rings; and
   (c) a plurality of units, each connected to the output of a respective one of said gate means, each unit incorporating
      (1) a resettable binary counter responsive to the series of pulses passed by the respective gate means, said counter being advanced by an L signal and reset by a 0 signal; and
      (2) means for determining whether, upon the reception of a 0 signal and prior to the resetting of said counter, the count reached by said counter exceeded a predetermined threshold value.

7. In a radar signal processing arrangement, the combination which comprises:
   (a) a resettable binary counter having input means including a counting input and a resetting input;
   (b) means for applying to said input means a series of pulses made up of L and 0 signals such that the L signals are applied to said counting input and the 0 signals are applied to said resetting input;
   (c) a comparison circuit for comparing the contents of said counter with a predetermined threshold value and for producing an output signal if the contents of said counter exceeds said predetermined threshold value;
   (d) an AND-circuit having a first input connected to the output of said comparison circuit and a second input connected to said pulse applying means to receive only 0 signals therefrom; and
   (e) means connected to the output of said AND-circuit for producing a signal representing the presence of a target.

8. In a radar signal processing arrangement, the combination which comprises:
   (a) a resettable binary counter having input means including a counting input and a resetting input;
   (b) means for applying to said input means a series of pulses made up of L and 0 signals such that the L signals are applied to said counting input and the 0 signals are applied to said resetting input;
   (c) a comparison circuit for comparing the contents of said counter with a predetermined threshold value and for producing an output signal if the contents of said counter exceeds said predetermined threshold value;
   (d) an AND-circuit having a first input connected to the output of said comparison circuit and a second input connected to said pulse applying means to receive only 0 signals therefrom;
   (e) gate means having one input connected to the output of said counter and another input connected to the output of said AND-circuit so that when said AND-circuit produces an output signal, the contents of said counter is passed by said gate means; and
   (f) means connected to the output of said AND-circuit and the output of said gate means for determining the azimuth of the target.

9. In a radar signal processing arrangement, the combination which comprises:
   (a) a resettable binary counter having input means including a counting input and a resetting input;
   (b) means for applying to said input means a series of pulses made up of L and 0 signals such that the L signals are applied to said counting input and the 0 signals are applied to said resetting input;
   (c) a comparison circuit for comparing the contents of said counter with a predetermined threshold value and for producing an output signal if the contents of said counter exceeds said predetermined threshold value;
   (d) an AND-circuit having a first input connected to the output of said comparison circuit and a second input connected to said pulse applying means to receive only 0 signals therefrom;
   (e) gate means having one input connected to the output of said counter and another input connected to the output of said AND-circuit so that when said AND-circuit produces an output signal, the contents of said counter is passed by said gate means;
   (f) an azimuth bearing counter having an interrogating input connected to the output of said AND-circuit, said azimuth bearing counter producing, upon interrogation thereof, an output signal representing the bearing of the target at the instant of interrogation; and
   (g) a computer connected to the output of said gate means and to the output of said azimuth bearing counter to receive, from the former, a signal representative of the width of the target and, from the latter, a signal representative of the bearing of one end of the width of the target for computing from this information the bearing of the middle of the target.

10. In a radar signal processing arrangement, the combination which comprises:
    (a) a resettable binary counter having a counting input and a resetting input;
    (b) means for applying a series of pulses made up of L and 0 signals to said inputs, said means including first and second diodes connected with opposite polarities to said counting and resetting inputs, respectively, so that only L signals are applied to said counting input and only 0 signals are applied to said resetting input;
    (c) a comparison circuit for comparing the contents of said counter with a predetermined threshold value and for producing an output signal if the contents of said counter exceeds said predetermined threshold value;
    (d) an AND-circuit having a first input connected to the output of said comparison circuit and a second input connected to the output of said second diode; and
    (e) means connected to the output of said AND-circuit for producing a signal representing the presence of a target.

11. The combination defined in claim 10, further comprising delay means interposed between the output of said second diode and said resetting input of said counter.

12. In a radar signal processing arrangement, the combination which comprises:
    (a) means for digitalizing the signals received by a radar set to produce a series of pulses made up of L and 0 signals;
    (b) a single unit incorporating (1) a resettable binary counter responsive to a series of pulses made up of L and 0 signals, said counter being advanced by an L signal and reset by a 0 signal; and (2) means for determining whether, upon the reception of a 0 signal and prior to the resetting of said counter, the count reached by said counter exceeded a predetermined threshold value;

(c) a digtal store with storing cells, each of which is coordinated to at least one distance ring; and (d) time multiplexing means interconnecting said unit and said storing cells in sequence.

13. In a radar signal processing arrangement, the combination which comprises:

(a) a resettable binary counter having input means including a counting input and a resetting input;

(b) means for deriving from a radar set a series of pulses made up of L and 0 signals and for applying said series of pulses to said input means of said counter such that the L signals are applied to said counting input and the 0 signals are applied to said resetting input; and (c) a comparison circuit for comparing the contents of said counter with a predetermined threshold value and for producing an output signal if the contents of said counter exceeds said predetermined threshold value.

References Cited by the Examiner

UNITED STATES PATENTS 2,761,968  9/1956  Kuder _____ 340—347.1

FOREIGN PATENTS 1,147,248  6/1957  France.

CHESTER L. JUSTUS, *Primary Examiner.*